(No Model.)
H. R. KNOX.
POWER TRANSMITTER.
No. 428,497. Patented May 20, 1890.
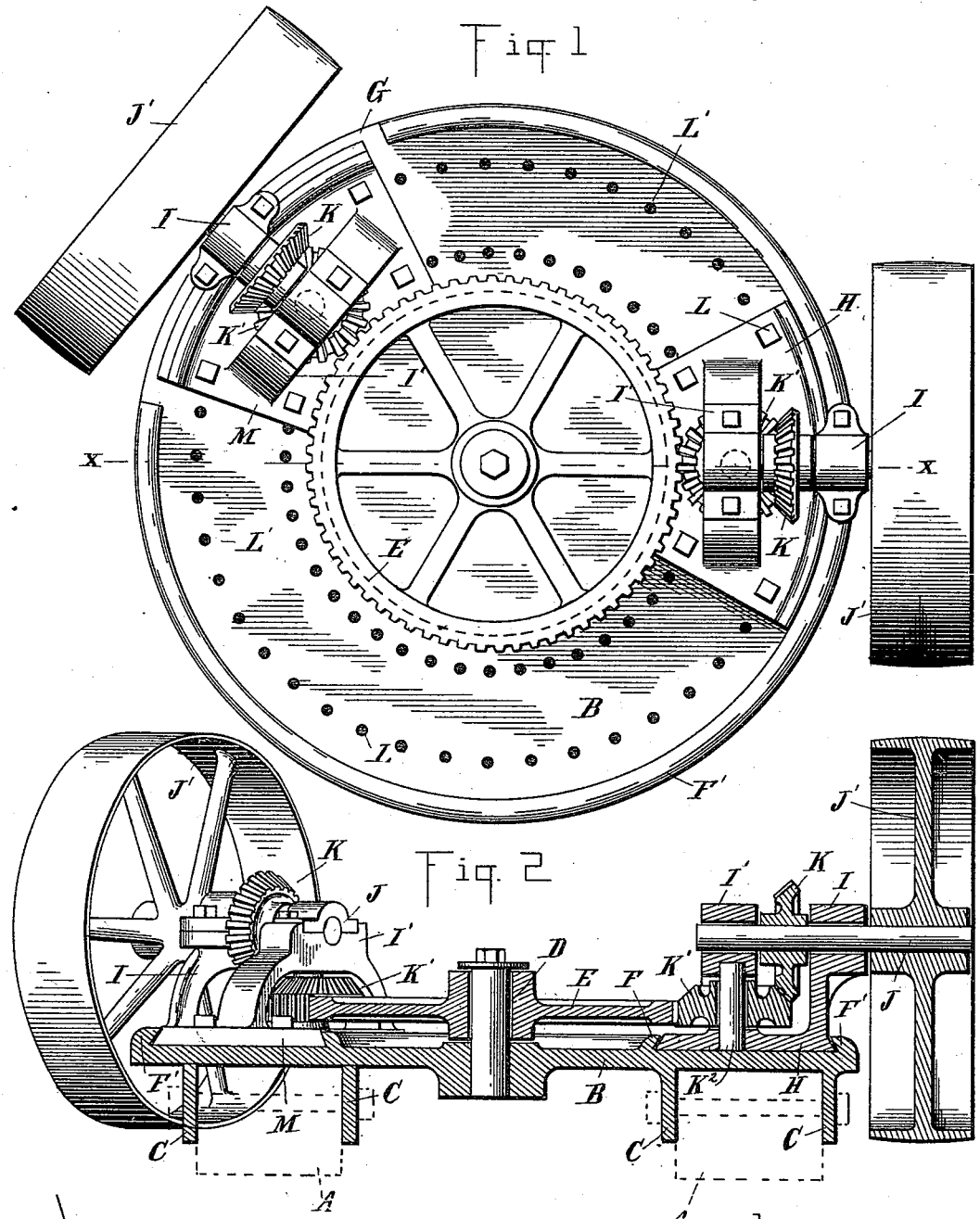
Witnesses:
P. M. Hulbert
Geo. Gregg
Inventor:
Howard R. Knox
By Thos. S. Sprague & Son
Atty.

UNITED STATES PATENT OFFICE.

HOWARD R. KNOX, OF RICHMOND, MICHIGAN.

POWER-TRANSMITTER.

SPECIFICATION forming part of Letters Patent No. 428,497, dated May 20, 1890.

Application filed March 10, 1890. Serial No. 343,531. (No model.)

*To all whom it may concern:*

Be it known that I, HOWARD R. KNOX, a citizen of the United States, residing at Richmond, in the county of Macomb and State of Michigan, have invented certain new and useful Improvements in Machines for Transmitting Power, of which the following is a specification, reference being had therein to the accompanying drawings.

This invention relates to new and useful improvements in machines for transmitting motion; and the invention consists in the peculiar construction and arrangement of the various parts, whereby the power from a driven shaft is conveyed to the driving-shaft by compactly-arranged gearing, and whereby the angle between the two shafts may be adjusted to any desired extent by the adjustment of either the driven or driving pulley, all as more fully hereinafter described.

My machine is designed to be used in connection with thrashing-machines, whereby the engine may be placed in such relation to the thrasher that the wind will not convey sparks or cinders to the stock or barn.

In the present state of the art such machines have been built, which, however, are so arranged that the master-wheel has the driving and driven pinions meshing therewith upon the top. In such construction the weight and power applied to the master-wheel tend to tip it and cause unnecessary friction and wear. The driving and driven shaft have also been supported at one end only in rigid bearings, thereby allowing further opportunity for lost motion and wear of the parts. It is to overcome these defects and present a more compact and rigid device, which will have a long life with the least possible wear, that my invention is designed.

In the drawings which accompany this specification, Figure 1 is a plan view of my machine. Fig. 2 is a vertical central section thereof on line *x x*.

A is a frame, upon which the circular platform B is bolted, preferably through the flanges C, cast upon the under side thereof. This platform is centrally apertured to receive the stub-shaft D, upon which is journaled the master gear-wheel E. This wheel may be loose or tight upon this shaft D. The platform has a circular dovetail groove formed between the inclined flanges F F'. The flange F' is cut away at G to allow the engagement into the groove of the sliding segmental block H. Upon this block is formed bearings for the shaft J, which is the driven shaft, and carries the drive-pulley J'. Between the bearings in the brackets I I' upon the shaft J is secured the bevel gear-pinion K, which meshes with the bevel-gear upon the upper face of the gear-pinion K', which has a circumferential gear engaging with the master-wheel E. The pinion K' is journaled upon the vertical shaft $K^2$, one end of which is secured in the block H and the other end in the under side of the bracket I'. This block H may be moved in its sliding bearings to any desired point, and is secured by the bolts L, which engage in suitable apertures L', which are radially arranged in the platform between the flanges, the block H being correspondingly apertured to receive the bolts. It will be seen by this construction that the shaft J, carrying the pinion K, is supported in stationary bearings at both ends, which bearings are supported upon a movable base or block.

The pinions K and K' are always in fixed relation to each other, and both being of small diameter there is no danger of tipping, while the motion to and from the master-wheel E is obtained by meshing with circumferential gearing, thereby insuring rotation of this wheel constantly in the same plane.

M is a block similar to the block H and carrying corresponding parts, which I refer to by like letters of reference to those used in describing the parts upon the block H. This block I preferably secure opposite the cutaway portion G in the flange, and do not adjust it, using the pulley upon its shaft for the driving-pulley. It frequently happens, however, that after the driven pulley is adjusted and its belt in position the driving pulley is found to be a little out of line, and it becomes necessary to adjust it, which I am enabled to do with my construction without the necessity of changing the parts already adjusted.

While I show the flanges F F' forming between them a dovetail groove in which the blocks H are adjustable, it is evident that these flanges may be omitted and the adjustment of the blocks be accomplished without the flanges by a suitable location of the apertures L', in which the bolts L engage.

What I claim as my invention is—

1. In a machine for transmitting motion, the combination, with the platform and a master-wheel journaled thereon, of two blocks adjustably secured concentrically with said wheel and carrying the driving and driven gears, substantially as described.

2. In a machine for transmitting motion, the combination, with the platform, a master-wheel journaled thereon and having circumferential gearing, of two blocks adjustably secured concentrically with said wheel and carrying driving and driven gear, meshing with the circumferential gear upon the master-wheel, substantially as described.

3. In a machine for transmitting motion, the combination, with the platform and a master-wheel journaled thereon, of the blocks H M, adjustable in circular bearings concentric with said wheel and carrying the driving and driven gear, substantially as described.

4. In a machine for transmitting motion, the combination, with the platform having apertures L', and a master-wheel journaled thereon, of the blocks H, slidingly secured in circular bearings concentric with said wheel, and the bolts L, substantially as described.

5. In a machine for transmitting motion, the combination, with the platform and a master-wheel journaled thereon, of a block adjustably secured in circular bearings concentric with said wheel and carrying gearing meshing with a circumferential gear upon the master-wheel, and with gearing for driving the shaft J, substantially as described.

6. In a machine for transmitting motion, the combination, with the platform and master-wheel, of the blocks H, slidingly secured in bearings concentric with the master-wheel, the shafts J and $K^2$, secured in stationary bearings thereon and carrying the pinions K K', substantially as described.

7. In a machine for transmitting motion, comprising a platform, a master-wheel, and driven and driving shafts, the block H, slidingly secured concentrically to said master-wheel and having the brackets I I', the shaft J, journaled in said brackets, the pinion K upon said shaft between the bearings, the shaft $K^2$, carrying the pinion K', driven by the pinion K and meshing with circumferential gear upon the master-wheel, substantially as described.

In testimony whereof I affix my signature, in presence of two witnesses, this 25th day of February, 1890.

HOWARD R. KNOX.

Witnesses:
W. B. O'DOGHERTY,
S. M. HULBERT.